(12) United States Patent
Molayem

(10) Patent No.: US 8,695,844 B1
(45) Date of Patent: Apr. 15, 2014

(54) LID HOLDING HANDLE

(75) Inventor: Daryoosh Molayem, Beverly Hills, CA (US)

(73) Assignee: Tabletops Unlimited, Inc., Carson, CA (US)

( * ) Notice: Subject to any disclaimer, the term of this patent is extended or adjusted under 35 U.S.C. 154(b) by 1048 days.

(21) Appl. No.: 12/344,081

(22) Filed: Dec. 24, 2008

(51) Int. Cl.
*A47J 36/12* (2006.01)

(52) U.S. Cl.
CPC .................................. *A47J 36/12* (2013.01)
USPC ............................ 220/744; 220/756; 220/772

(58) Field of Classification Search
CPC ....................................................... A47J 36/12
USPC ......... 220/379, 744, 752, 756, 759, 769, 772; 16/111.1, 444
IPC .................. A47J 36/12, 45/06, 47/16
See application file for complete search history.

(56) References Cited

U.S. PATENT DOCUMENTS

| | | | | |
|---|---|---|---|---|
| 471,565 | A | * | 3/1892 | Nourse .......................... 220/379 |
| 1,232,851 | A | * | 7/1917 | Sayers .......................... 220/744 |
| 1,299,832 | A | * | 4/1919 | Hodsworth .................... 220/744 |
| 1,390,766 | A | * | 9/1921 | Cunningham ................. 220/744 |
| 1,459,862 | A | * | 6/1923 | Scudder ........................ 220/744 |
| 1,745,548 | A | | 3/1928 | Lerner |
| 2,258,145 | A | * | 10/1941 | Woodman ..................... 220/379 |
| 2,541,604 | A | * | 2/1951 | Normandin ................... 220/744 |
| D231,718 | S | | 6/1974 | Eade |
| 4,911,310 | A | | 3/1990 | Raishe et al. |
| 4,915,433 | A | * | 4/1990 | Schafer .......................... 294/12 |
| 4,936,536 | A | | 6/1990 | Meneghello |
| 5,246,195 | A | | 9/1993 | Huff |
| D401,496 | S | | 11/1998 | Lambert et al. |
| 6,105,810 | A | * | 8/2000 | Daenen et al. ................. 220/379 |
| D558,514 | S | * | 1/2008 | Molayem ....................... D7/394 |
| D612,198 | S | * | 3/2010 | Molayem ....................... D7/394 |
| 2006/0174776 | A1 | | 8/2006 | Fissler |

FOREIGN PATENT DOCUMENTS

| | | | | |
|---|---|---|---|---|
| DE | 19923305 A1 | * | 11/2000 | ............. A47J 36/12 |
| DE | 10006007 A1 | | 8/2001 | |

(Continued)

OTHER PUBLICATIONS

EPO machine translation of DE10006007, retrieved from http://translationportal.epo.org/emtp/translate/?ACTION=description-re...EP&Number=10006007&OPS=ops.epo.org&TRGLANG=en&ENGINE=google&SRCLANG=de, 2 pages, Sep. 14, 2011.*

(Continued)

*Primary Examiner* — Stephen F Gerrity
(74) *Attorney, Agent, or Firm* — Blakely, Sokoloff, Taylor & Zafman LLP

(57) ABSTRACT

A cooking vessel having a handle for supporting a lid is described. The handle may include an upper support member having an upper arcuate body coupled to the cooking vessel at opposite ends and a lower support member having a lower arcuate body coupled to the cooking vessel at opposite ends. The lower arcuate body and the upper arcuate body may define a receiving space for receiving the cooking vessel lid. The upper support member and the lower support member may have sheet like portions. The support members may further be dimensioned to support the lid within the receiving space at an angle from a side of the cooking vessel of between 45 degrees and 90 degrees.

8 Claims, 3 Drawing Sheets

(56) References Cited

FOREIGN PATENT DOCUMENTS

| | | | | | |
|---|---|---|---|---|---|
| DE | 10247961 | A1 | | 10/2003 | |
| EP | 1064872 | A1 | * | 1/2001 | ............... A47J 36/12 |
| FR | 2658407 | A1 | * | 8/1991 | ............... A47J 36/12 |
| GB | 2326081 | A | * | 12/1998 | ............... A47J 36/12 |
| JP | 06225834 | A | * | 8/1994 | ............... A47J 36/12 |
| JP | 07313372 | A | * | 12/1995 | ............... A47J 36/12 |
| JP | 09252934 | A | * | 9/1997 | ............... A47J 27/00 |
| JP | 2006174886 | A | * | 7/2006 | ............... A47J 47/16 |
| JP | 2006198140 | A | * | 8/2006 | ............... A47J 47/16 |

OTHER PUBLICATIONS

EPO machine translation of DE19923305, retrieved from http://translationportal.epo.org/emtp/translate/?ACTION=description-re... EP&NUMBER=19923305&OPS=ops.epo.org&TRGLANG=en&ENGINE=google&SRCLANG=de, 2 pages, Sep. 14, 2011.*

EPO machine translation of EP1064872, retrieved from http://translationportal.epo.org/emtp/translate/?ACTION=description-re..._EP&NUMBER=1064872&OPS=ops.epo.org&TRGLANG=en&ENGINE=google&SRCLANG=fr, 3 pages, Sep. 14, 2011.*

* cited by examiner

LID HOLDING HANDLE

BACKGROUND

1. Field

A lid holding handle. More specifically, a lid holding handle attached to a cooking vessel.

2. Background

Cooking vessels such as pots and pans are typically used for cooking foods on a stove top. Pots and pans typically have a lid which may be placed on the vessel to prevent splattering of the food cooking therein or to contain the heat. Often times, the lid must be removed from the vessel during the cooking process to add additional ingredients or to stir the food. The removed lid is typically placed on a counter near the stove top or an adjacent burner which is not in use so that the user has both hands free to tend to the food within the vessel. The lid, however, often collects moisture on its inner surface which drips off the lid when placed on the counter face down. Accordingly, the lid is often times placed on the counter with the inner surface facing up to prevent dripping of the moisture onto the counter. Due to the curved surface of most lids and the handle typically attached to the center of the lid, however, the lid often rolls around the counter leaving the counter soiled due to food that may have bubbled over onto the edges of the lid.

BRIEF DESCRIPTION OF THE DRAWINGS

The following illustration is by way of example and not by way of limitation in the figures of the accompanying drawings in which like references indicate like elements. It should be noted that references to "an" or "one" embodiment in this disclosure are not necessarily to the same embodiment, and such references mean at least one.

DETAILED DESCRIPTION

In this section we shall explain several embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration.

Figure 1:
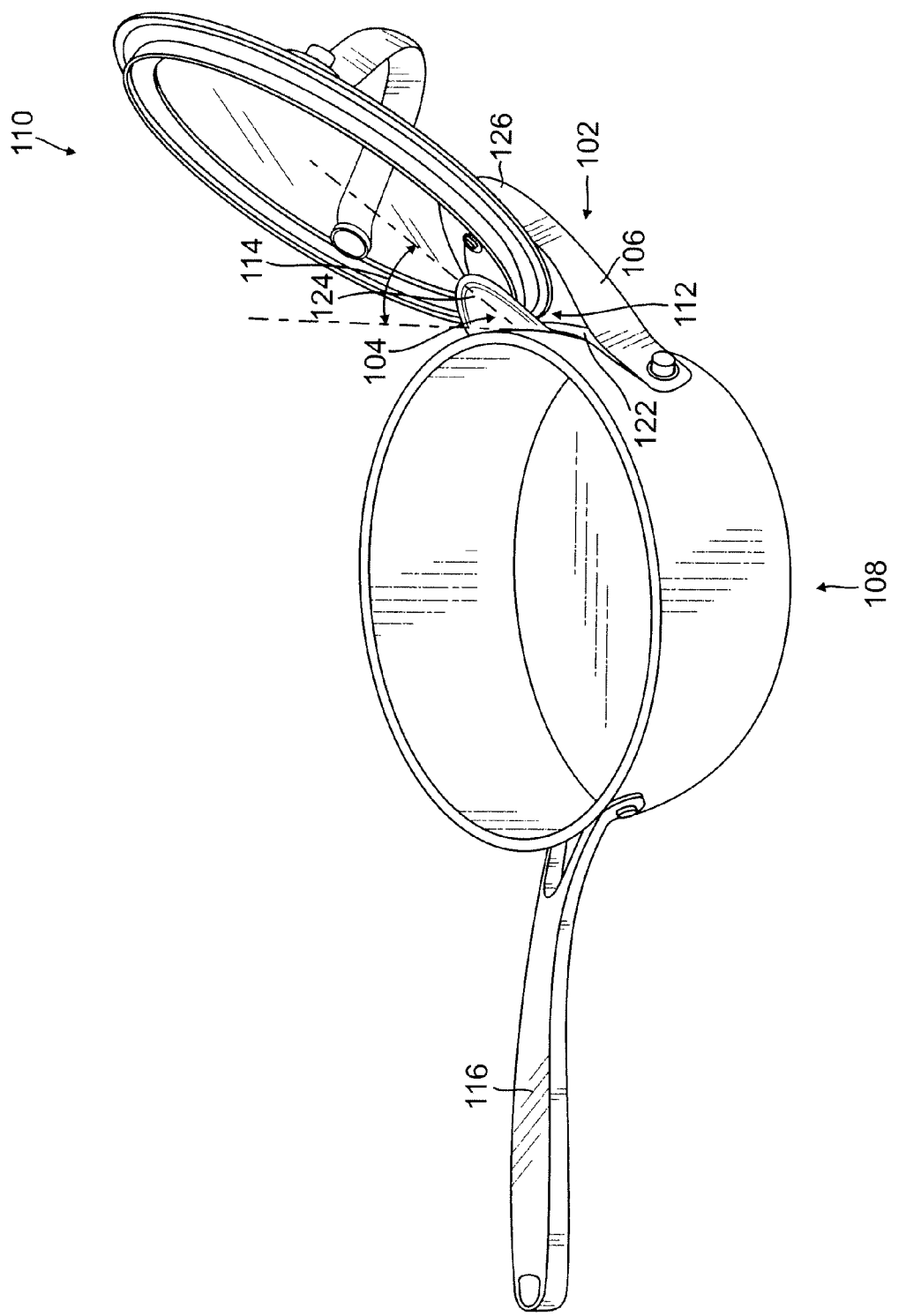
FIG. 1 is an elevation view of a handle according to an embodiment of the invention.

FIG. 1 is an elevation view of a handle according to an embodiment of the invention. Handle 102 is shown attached to container 108. Handle 102 is attached to a substantially vertical side wall of container 108 such that it extends from the side of container 108 at an angle between a horizontal plane and the vertical plane of the side wall of container 108. Container 108 may be a cooking vessel including, but not limited to, a pot, a pan, a crock, a deep dish, a bowl or any similar cooking vessel. In some embodiments, in addition to handle 102, container 108 may have a second handle 116 extending from a side wall of container 108 opposite that of handle 102. In still further embodiments, handle 116 may be omitted and another handle similar to handle 102 may be on the opposite side wall of container 108 such that two of handles 102 are attached to container 108.

Lid 110 dimensioned to cover container 108 is further shown in FIG. 1. Lid 110 may be any standard lid designed to cover its mate container 108. Container 108, lid 110 and handle 102 may be made of any material capable of withstanding the heat applied during cooking of food. Container 108, lid 110 and handle 102 may be made of the same or different materials. Representative materials may include, but are not limited to, metals such as steel, stainless steel, copper or the like or non-conductive materials such as glass or ceramic.

Handle 102 is dimensioned to support lid 110 and in particular, its edge or periphery, against a side of container 108 during cooking. Handle 102 may further be dimensioned to facilitate lifting of container 108. In this aspect, handle 102 may include first support member 104 and second support member 106. In some embodiments, first support member 104 includes base plate 122 positioned against and around a curved side of container 108, and an arcuate body or lip portion 124 which extends upwards from base plate 122 as shown. Second support member 106 may further include arcuate body portion 126 which extends from the side of container 108. Second support member 106 may be substantially "U" shaped so that a user's fingers may be inserted under and around second support member 106 to lift container 108. Arcuate body 124 and arcuate body 126 extending from the side of container 108 are vertically spaced such that cavity or receiving space 112 is formed between them. An edge or periphery portion of lid 110 may be inserted within receiving space 112 and supported along a side of container 108 by arcuate body 124 of first member 104 and arcuate body 126 of second member 106 during cooking.

Arcuate body 124 and arcuate body 126 may extend from the side of container 108 at an angle such that lid 110 may be held within receiving space 112 at angle 114. Angle 114 may be any angle sufficient to prevent, or reduce the amount of, moisture which condenses on the inside of lid 110 during the cooking process from dripping off. In this aspect, when lid 110 needs to be removed from its horizontal cooking position during cooking to, for example add an ingredient or mix the food within container 108, lid 110 can be positioned within receiving space 112 until it is time to re-cover the pot without moisture dripping onto the burners or the counter. In some embodiments, angle 114 may be between about 45 degrees and about 90 degrees. Representatively, angle 114 may be between 50 degrees and 60 degrees, for example, 57 degrees.

To enhance stability of lid 110 held by handle 102, first member 104 and second member 106 may be dimensioned such that lid 110 is contacted in at least three separate points when lid 110 is positioned within receiving space 112. For example, first member 104 may be dimensioned to contact lid 110 at one point while second member 106 is dimensioned to contact lid 110 at two different points. In one embodiment, arcuate body 124 of first member 104 may contact an inner surface edge of lid 110 at one point while arcuate body 126 of second member 106 contacts edges of an outer surface of lid 110 at two different points on opposite sides of the point along the inner surface. Arcuate body 126 of second member 106 may extend further from the side of container 108 than arcuate body 124 of first member 104. Additionally, arcuate body 126 of second member 106 may be positioned below arcuate body 124 of first member 104 (i.e., closer to the base of container 108 than first member 104). In this aspect, the weight of lid 110 is supported at two different points primarily by second member 106 and lid 110 is prevented from tipping out of receiving space 112 by first member 104.

In addition to preventing (or reducing the amount of) moisture from dripping off lid 110, the dimensions of first member 104 and second member 106 in combination with angle 114 help to balance the weight of lid 110 within handle 102 so that container 108 does not tip. The specific dimensions of handle 102 and angle 114 are shown in further detail in FIG. 2 and FIG. 3.

Figure 2:
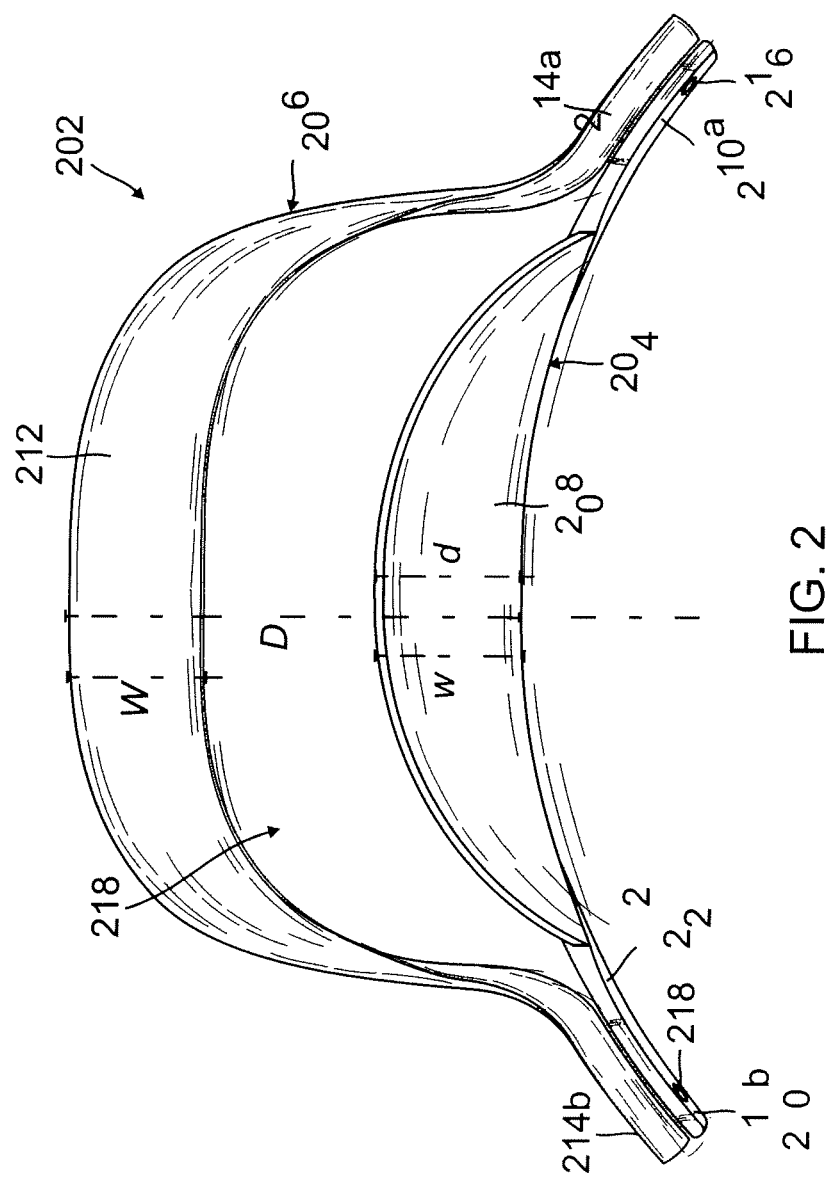
FIG. 2 is a top view of a handle according to an embodiment of the invention.

FIG. 2 is a top view of a handle according to an embodiment of the invention. Handle 202 includes first member 204 and second member 206. First member 204 and second member 206 work together to support a lid positioned within receiving space 218 as previously described. In this aspect, arcuate body 212 of second member 206 extends further from a side of the container to which it is attached then arcuate body 208 of first member 204. Arcuate body 208 may extend from base plate 222 which is positioned below arcuate body 208 along a side of the container to provide added stability to arcuate body 208. As previously discussed, according to this configuration, the weight of a lid positioned within receiving space 218 between first member 204 and second member 206 is supported by second member 206. First member 204, in turn, is positioned along an opposite side of the lid to prevent the lid from tipping over the end of second member 206. In this aspect, first member 204 need only extend a distance from the side of the container sufficient to contact an edge of the lid.

In some embodiments, the distance D second member 206 extends from a side of the container is about three times that of distance d first member 204 extends. Representatively, distance D may be from about 45 to 55 millimeters and distance d may be from about 15 to 18 millimeters. For example, distance D may be 49.8 millimeters and distance d may be 16.55 millimeters. It is contemplated, however, that the distances D and d may vary depending upon the size of the container handle 202 is attached to and the weight of lid to be used with the container. In particular, the smaller the container handle 202 is used with, the smaller distances D and d will be.

Arcuate body 208 and 212 include a planar or sheet like portion which contacts the lid resting there between. In this aspect, arcuate body 208 and arcuate body 212 have a greater surface area for contacting and supporting the lid. The width, w, of the sheet like portion of body 208 and the width, W, of the sheet like portion of body 212 may be the same or different. Representatively, in one embodiment, the width of the sheet like portion of body 208 may be about 16.55 millimeters and the width of the sheet like portion of body 212 may be about 14.55 millimeters. Although specific widths are disclosed, it is contemplated that the widths may vary depending upon, for example, the size of the container handle 202 is attached to and the dimensions of the mating lid.

First support member 204 and second support member 206 terminate with ends 210a, 210b and 214a, 214b, respectively, to facilitate attachment of handle 202 to the container. Ends 210a and 214a may be attached to the container at the same point. Similarly, ends 210b and 214b may be attached to the container at the same point. In this aspect, ends 210a and 210b may be positioned on a side of the container and ends 214a and 214b may be positioned over ends 210a and 210b, respectively. Ends 210a, 210b, 214a and 214b may have a flattened dimension which conforms to the curvature of the wall of the container to facilitate attachment. Holes 216 and 218 formed through each of the ends may be aligned so that, for example a bolt, may be inserted through ends 210a and 210b and through the side of the container to attach handle 202 to the container. Although first member 204 and second member 206 of handle 202 are shown attached together to the container in FIG. 1, it is contemplated that they may be attached separately and at different points along the container. It is further contemplated that hardware other then, for example bolts, such as screws, pins or clips may be used to attach first member 204 and second member 206 to the container. In still further embodiments, ends 210a, 210b and 214a, 214b may be integrally formed with or welded to the side of the container.

Once first member 204 and second member 206 are attached to the container, a lid may be positioned and held within receiving space 218. In some embodiments, the lid is inserted into receiving space 218 with the inner surface facing upward such that first member 204 contacts the lid inner surface and second member 206 contacts the lid outer surface. Since the lid is held within handle 202 at an angle as discussed herein, moisture on the inner surface of the lid remains within the lid.

Figure 3:
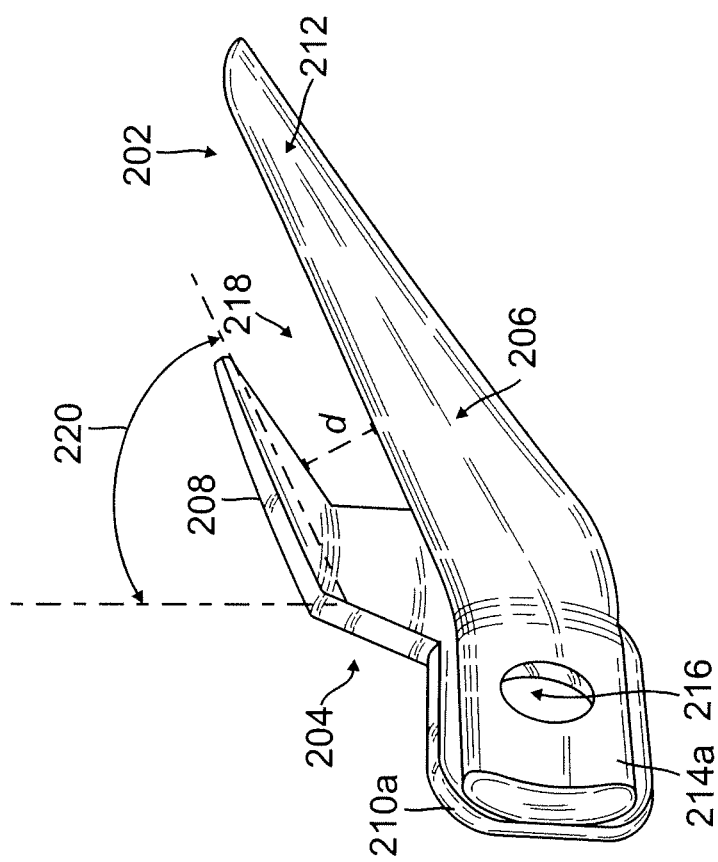
FIG. 3 is a side view of the handle of FIG. 2.

FIG. 3 is a side view of the handle of FIG. 2. From this view, the dimensions of receiving space 218 formed between first member 204 and second member 206 to hold the lid at an angle can be seen. In particular, the sheet like portion of arcuate body 208 of first member 204 extends from a vertical side of the container at angle 220. Angle 220 is the same as angle 114 described in reference to FIG. 1. The sheet like portion of arcuate body 212 of second member 206 extends from the container substantially parallel to arcuate body 208. In this aspect, a distance d sufficient for insertion of a lid within receiving space 218 is formed between body 208 and body 212. In some embodiments, distance d may be from about 10 millimeters to 20 millimeters, for example, about 14 millimeters. It is contemplated, however, that distance d may vary depending upon the size of the container to which handle 202 is attached and the dimensions of the mating lid. The lid is then held within receiving space 218 at an angle substantially the same as angle 220 to prevent moisture from dripping off the lid.

In the foregoing specification, the invention has been described with reference to specific embodiments thereof. It will, however, be evident that various modifications and changes can be made thereto without departing from the broader spirit and scope of the invention as set forth in the appended claims. For example, in some of the figures, the handle includes two support members. An alternative may be to replace the upper support member with a lip extending from the vessel and attach the lower support member to a portion of the vessel below the lip such that the lid rests between the lip and lower support member. The specification and drawings are, accordingly, to be regarded in an illustrative rather than a restrictive sense.

The invention claimed is:

1. An apparatus comprising:
a handle coupled to a cooking vessel, the handle dimensioned to support a cooking vessel lid, the handle having:
an upper support member having an upper arcuate body coupled to the cooking vessel at opposite ends, and
a lower support member having a lower arcuate body positioned closer to a base of the cooking vessel than the upper arcuate body and coupled to the cooking vessel at opposite ends, the lower arcuate body and the upper arcuate body having substantially planar portions between which a receiving space is defined for receiving the cooking vessel lid, wherein the substantially planar portion of the upper arcuate body and the substantially planar portion of the lower arcuate body both extend from a side of the vessel at essentially the same angle relative to the side of the vessel so that when the lid is positioned within the receiving space in a supported position, the lid is supported by the handle at about the same angle relative to the side of the vessel.

2. The apparatus of claim 1, wherein the angle is between 45 degrees and 90 degrees from the side of the cooking vessel.

3. The apparatus of claim 1, wherein the cooking vessel is a pot.

4. An apparatus comprising:
- a cooking vessel having a lid and a base, and
- a handle coupled to the cooking vessel, the handle comprising a first support member having a first sheet like portion and a second support member having a second sheet like portion, the first support member and the second support member defining a cavity there between for receiving the lid such that a majority of the lid is positioned at an angle from a side of the cooking vessel of between 45 degrees and 90 degrees, wherein the first and second sheet like portions extend outwardly from the side of the vessel at essentially this same angle relative to the side of the vessel, and wherein the first sheet like portion extends outwardly from the side of the cooking vessel at a position further away from the base of the vessel than the second support member.

5. The apparatus of claim 4, wherein at least one of the first support member and the second support member are curved around a portion of the cooking vessel.

6. The apparatus of claim 4, wherein the second support member extends a first distance from the cooking vessel to support the lid without causing the cooking vessel to tip.

7. The apparatus of claim 6, wherein the first support member extends a second distance from the cooking vessel, the second distance is less than the first distance.

8. The apparatus of claim 4, wherein the first sheet like portion of the first support member is positioned above the second sheet like portion of the second support member.

* * * * *